United States Patent [19]

Harris

[11] 4,044,444
[45] Aug. 30, 1977

[54] TUBE TRAVELER

[75] Inventor: Richard T. Harris, Newport, Mich.

[73] Assignee: William W. Sismore, Newport, Mich.; a part interest

[21] Appl. No.: 657,357

[22] Filed: Feb. 12, 1976

[51] Int. Cl.² .............................................. B23P 15/26
[52] U.S. Cl. ........................................ 29/727; 29/255; 29/427
[58] Field of Search .............. 29/202 D, 252, 427, 29/202 R, 256, 200 D, 234, 244, 255

[56] References Cited

U.S. PATENT DOCUMENTS

| 3,149,412 | 9/1964 | Curfman et al. | 29/202 R |
|---|---|---|---|
| 3,613,212 | 10/1971 | Miller | 29/202 R |
| 3,650,012 | 3/1972 | Graveman | 29/427 X |
| 3,785,026 | 1/1974 | Ohmstede | 29/427 X |
| 3,924,316 | 12/1975 | Matlock et al. | 29/202 R |

Primary Examiner—Victor A. DiPalma
Attorney, Agent, or Firm—Owen, Purdue, Emch & Barker

[57] ABSTRACT

An extractor for pulling individual tubes from a tube sheet in a heat exchanger. The extractor includes two pairs of drivers mounted in a housing on parallel rotatable shafts. The two drivers in each pair have inclined teeth which project into opposite sides of a passageway along which a tube is drawn. A variable speed pneumatic motor and a gear transmission rotate the four drivers at the same controlled speed and rotate the two drivers in each pair in opposite directions to advance a tube through the passageway.

5 Claims, 4 Drawing Figures

U.S. Patent  Aug. 30, 1977  Sheet 1 of 2  4,044,444
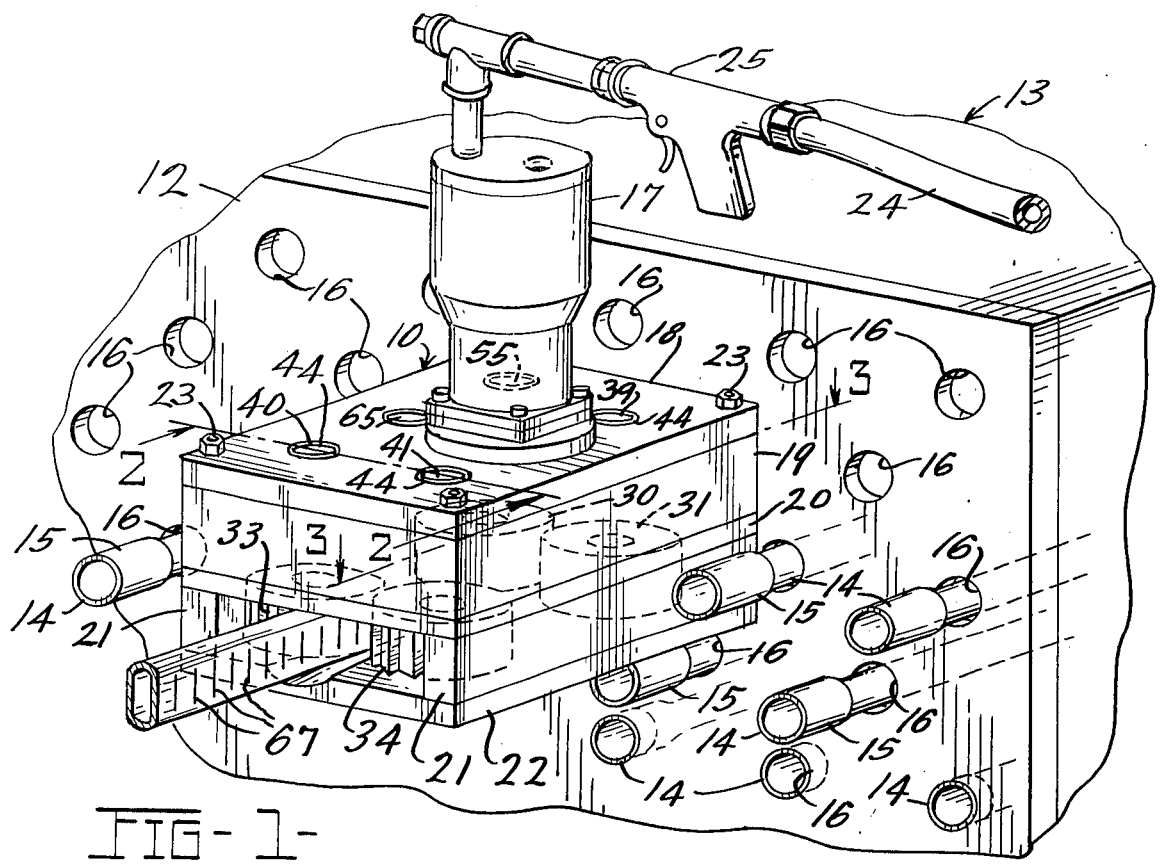
FIG-1-
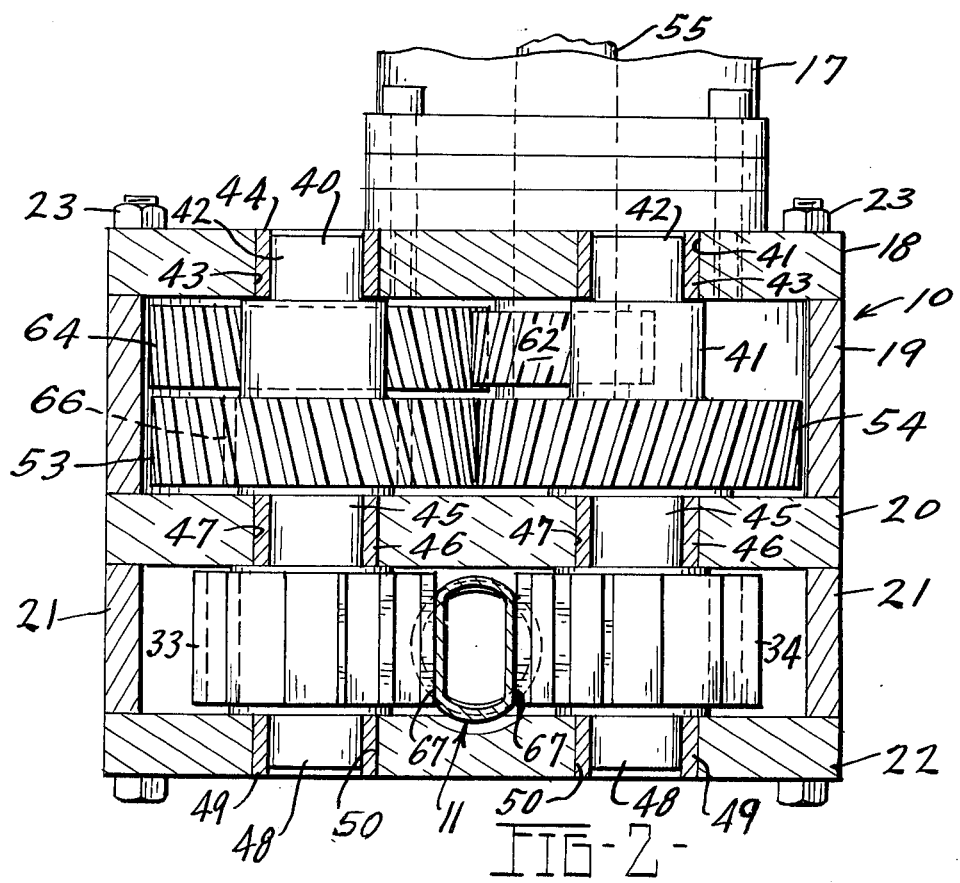
FIG-2-

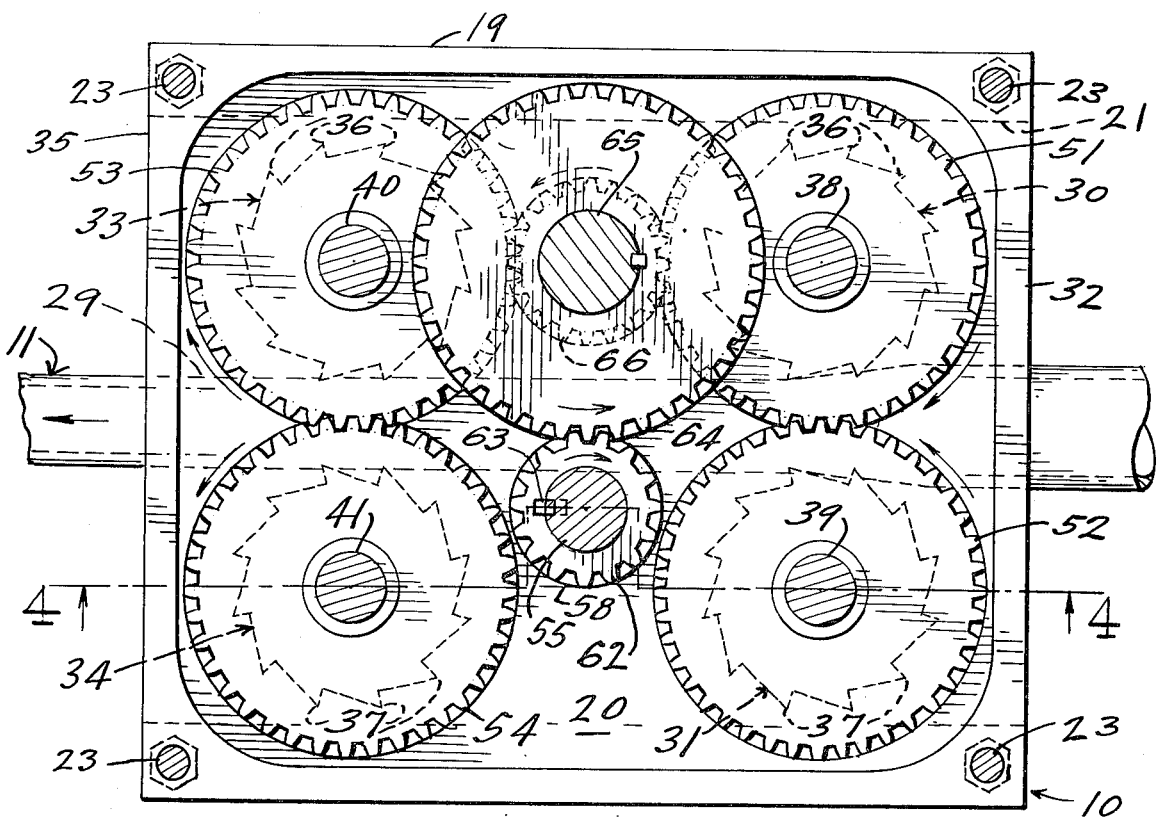
FIG-3-
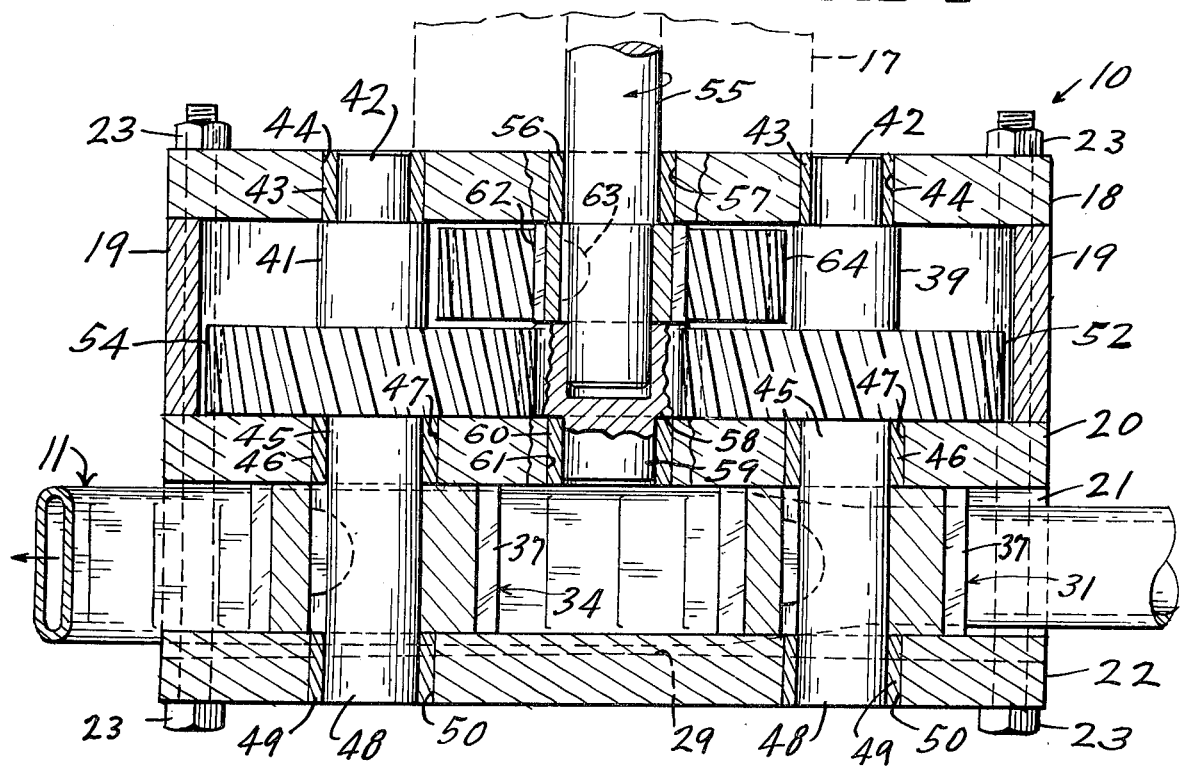
FIG-4-

TUBE TRAVELER

BACKGROUND OF THE INVENTION

This invention relates to disassembling tube type heat exchangers and more particularly to an extractor for pulling individual tubes from a tube sheet in heat exchangers, boilers, and the like.

Many heat exchangers are of an indirect type which employ tubes for carrying a heat transfer fluid. A large number of the tubes are mounted to extend in a parallel grid between two supporting tube sheets in such heat exchangers. The tubes are pressed into or expanded into engagement with openings through the tube sheet for forming a fluid tight seal. A heat transfer fluid, such as water, is circulated through the parallel tubes between the two tube sheets while a different temperature fluid, such as combustion gases or heated water is circulated past the exterior of the tubes between the two tube sheets for achieving indirect heat transfer between the two fluids. It is sometimes necessary to remove tubes from the tube sheets in which they are mounted. This may be necessary for many reasons, such as leaks in the tubes or excessive scale accumulations within the tubes.

The tubes commonly are held in the tube sheets by expanding the ends into engagement with the internal walls of openings through the tube sheets and are securely held therein by hoop stresses created by the expanding process. Various methods are used for relieving these hoop stresses to remove tubes from the tube sheets. One method used for removing the hoop stresses holding the tubes within the tube sheets is by cutting axial slots within the expanded end portion of the tube passing through the tube sheet, as disclosed in U.S. Pat. No. 3,628,246 which issued Dec. 21, 1971. Another method used for relieving tube stresses involves engaging the interior walls of the tube with expandable jaws on a mandrel and, subsequently, retracting a hydraulic cylinder connected to the mandrel to pull the tube end from the tube sheet, as disclosed in U.S. Pat. No. 3,835,520 which issued Sept. 17, 1974. After the hoop stresses are removed, it is necessary to pull the entire length of the tube through the tube sheet. This may be a difficult and time consuming process since tubes in some indirect heat exchangers, such as those used in nuclear reactors, may be on the order of 30 to 70 feet long and of considerable weight.

SUMMARY OF THE INVENTION

According to the present invention, an extractor is provided for pulling a tube through a tube sheet in a heat exchanger after the hoop stresses which seal the tube to the tube sheet are initially relieved by conventional prior art techniques. During such stress relief, the expanded end of the tube is initially pulled a few inches through the tube sheet to leave a projecting end for engagement by the tube extractor. The extractor includes a housing having two pairs of drivers mounted therein and having inclined teeth which project into a passageway through which a tube is advanced as it is pulled from the tube sheet. A variable speed pneumatic motor rotates the drivers through a gear transmission. The four drivers are rotated at the same speed about parallel axes, with the two drivers in each pair rotated in opposite directions to advance the tube along the passageway through the extractor housing. As the tube is pulled between the first pair of drivers, it is deformed by the inclined teeth to prevent the drivers from slipping on the tube. The pneumatic motor which operates the drivers is provided with a deadman's release throttle valve on an air inlet for controlling the motor speed and for safety purposes.

Accordingly, it is an object of the invention to provide an extractor for pulling a tube from a tube sheet in a heat exchanger.

Other objects and advantages of the invention will become apparent from the following detailed description, with reference being made to the accompanying drawings.

BRIEF DESCRIPTION OF THE DRAWINGS

FIG. 1 is a perspective view showing a tube extractor in accordance with the present invention, pulling a tube from a tube sheet in a heat exchanger;

FIG. 2 is a vertical cross-sectional view of a tube extractor taken along line 2—2 of FIG. 1;

FIG. 3 is a horizontal cross-sectional view of a tube extractor taken along line 3—3 of FIG. 1; and FIG. 4 is a vertical cross-sectional view of a tube extractor taken along line 4—4 of FIG. 3.

DESCRIPTION OF THE PREFERRED EMBODIMENT

Turning now to the drawings and particularly to FIG. 1, a tube extractor 10 constructed in accordance with the present invention is shown in the process of extracting a tube 11 from a tube sheet 12 in an indirect heat exchanger 13. The tube 11 is one of a plurality of tubes 14 which extends between the tube sheet 12 at one end of the heat exchanger 13 and a similar tube sheet (not shown) at an opposite end of the heat exchanger 13. Normally, each of the tubes 14 will have an end 15 which has been expanded to engage the walls of an opening 16 through the tube sheet 12. The openings 16 are arranged in the tube sheet 12 in a grid pattern for maintaining a preselected spacing between the tubes 14 during operation of the heat exchanger 13. When the heat exchanger 13 was originally assembled, the tubes 14 were initially inserted into the tube sheet openings 16 and the tube ends 15 were expanded to sealingly engage the walls of the openings 16. Sufficient hoop stresses remain within the tube ends 15 to prevent fluid leakage between the tube ends 15 and the tube sheet 12.

Due to various reasons, it is sometimes necessary to replace one or more of the tubes 14 in a heat exchanger 13. Tube replacement may be necessary, for example, because of excessive scale accumulation within the tubes 14 or cracking of any of the tubes 14. To replace the tubes 14 in the heat exchanger 13, it is first necessary to relieve the hoop stresses in the tube ends 15. This is accomplished by pulling the tube ends 15 from the tube sheet 12 by any conventional manner such as that disclosed in the above-mentioned U.S. Pat. No. 3,835,520. Several of the tubes 14 are shown in FIG. 1 as having their ends 15 pulled through the tube sheet 12. After the ends 15 are pulled through the tube sheet 12, the extractor 10 is used for pulling or walking the length of the tubes 14 from the tube sheet 12. The tube extractor 10 effectively pulls the tubes 14 from the tube sheet 12 even though the tubes may be of considerable length, such as up to 70 or more feet long in large heat exchangers, and of considerable weight.

The tube extractor 10 generally consists of a pneumatic motor 17 attached to a housing formed from an upper housing plate 18, an upper gear transmission housing 19, an intermediate housing plate 20, two opposed lower housing sides 21 and a lower housing plate 22. The housing components 18-22 are held together by any conventional manner such as by four bolts 23. The motor 17 shown in the drawings is of a pneumatic type, although an electric motor or other conventional type of motor may also be used in the tube extractor 10. It is desirable that the motor 17 be of a variable speed type to permit control over the speed at which the tube 11 is walked or advanced through the tube extractor 10. The motor 17 receives power from an air compressor (not shown) or other suitable source of compressed air connected to an air line 24. The air line 24 is connected through a manually controlled throttle valve 25 to the motor 17 for controlling the speed of the motor 17. The throttle valve 25 also acts as a deadman's release valve which automatically stops the tube extractor 10 in the event that an operator becomes incapacitated. During operation of the tube extractor 10, an operator manually positions the throttle valve 25 to pull the tube 11 through the tube sheet 12 at a controlled speed up to a predetermined maximum speed determined by the maximum speed of the motor 17 and the transmission gear ratio within the tube extractor 10. In an exemplary tube extractor 10, a tube 11 was advanced up to a maximum speed of 168 feet per minute and the tube extractor 10 exerted a pull force of 2650 pounds on the tube 11 without slippage.

Referring now to FIGS. 2-4, the construction of the tube extractor 10 is shown in greater detail. The tube 11 being extracted from the tube sheet 12 is advanced along a passageway 29 parallel to the lower housing sides 21 and extending between the intermediate housing plate 20 and the lower housing plate 22. A first pair of drivers 30 and 31 are positioned on opposite sides of the passageway 29 adjacent a rear housing end 32 and a second pair of drivers 33 and 34 are positioned on opposite sides of the passageway 29 adjacent a front housing end 35. The drivers 30 and 33 have inclined teeth 36 which project into one side of the passageway 29 and the drivers 31 and 34 have inclined teeth 37 which project into the opposite side of the passageway 29 for advancing the tube 11 along such passageway 29. The teeth 36 and 37 extend into the passageway 29 sufficiently to slightly flatten or deform the tube 11 as it is engaged by the teeth 36 and 37 to prevent slippage of the drivers 30, 31, 33 and 34 on the tube 11. One side of each of the inclined teeth 36 and 37 extends substantially radially on the drivers 30, 31, 33 and 34. The teeth 36 and 37 are oriented such that force is transferred through the substantially radial side of each tooth to the tube 11 for advancing the tube 11 with a maximum force and minimum tendency for slippage.

A transmission is provided within the upper gear housing 19 for rotating the drivers 30, 31, 33 and 34 at a same speed, with the pair of drivers 30 and 31 rotated in opposite directions and the pair of drivers 33 and 34 rotated in opposite directions. The four drivers 30, 31, 33 and 34 are mounted, respectively, on four parallel shafts 38-41 which extend perpendicularly through the three housing plates 18, 20 and 22 and also perpendicular to the passageway 29. Each of the shafts 38-41 has an upper journal 42 which rotates within a bearing 43 pressed into an opening 44 through the upper housing plate 18. Similarly, each of the shafts 38-41 includes an intermediate journal 45 which rotates within a bearing 46 which is pressed into an opening 47 through the intermediate housing plate 20 and each of the shafts 38-41 includes a lower journal 48 which rotates within a bearing 49 which is pressed into an opening 50 through the lower housing plate 22. Immediately above the intermediate housing plate 20, four helical tooth spur gears 51-54 are either keyed to or formed integrally with the shafts 38-41, respectively. The four spur gears 51-54 are of the same diameter for rotating the shafts 38-41 at the same speeds. The diameter of the gears 51-54 and the spacing between the shafts 38-41 are such that the gear 51 engages and drives the gear 52 and the gear 53 engages and drives the gear 54. As a consequence, the gears 51 and 52 will always rotate in opposite directions and the gears 53 and 54 will always rotate in opposite directions.

The motor 17 has an output shaft 55 which extends through a bearing 56 pressed into an opening 57 through the upper housing plate 18 and extends downwardly into a support member 58 which has a journal end 59 which engages a bearing 60 pressed into an opening 61 through the intermediate housing plate 20. A main drive gear 62 is attached to the shaft 55 by means of a key 63. The main drive gear 62 in turn engages and drives a helical tooth upper idler gear 64 which is either integral with or keyed to a shaft 65. A helical tooth lower idler gear 66 is also either integral with or keyed to the shaft 65 for rotation with the upper idler gear 64. The lower idler gear 66 is positioned immediately above the intermediate housing plate 20 and coplanar with the four spur gears 51-54. The lower idler gear 66 is positioned between and of a diameter for engaging the spur gears 51 and 53.

Referring particularly to FIG. 3, the direction in which the gears within the upper gear housing 19 rotate is illustrated. In viewing FIG. 3, it should be appreciated that the spur gears 51-54 and the lower idler gear 66 are positioned coplanar and that the main drive gear 62 and the upper idler gear 64 are positioned coplanar. When the motor 17 is energized, the motor shaft 55 rotates in a clockwise direction, as viewed from the top. The main drive gear 62 attached to the shaft 55 is simultaneously rotated in a clockwise direction. The main drive gear 62 in turn engages and rotates the upper idler gear 64 and the connected lower idler gear 66 in a counterclockwise direction. The lower idler gear 66 engages the spur gears 51 and 53 for driving both spur gears 51 and 53 and their connected shafts 38 and 40 in a clockwise direction. The shafts 38 and 40 in turn rotate the attached drivers 30 and 33 in a clockwise direction. As the spur gear 51 rotates in a clockwise direction, it engages and rotates the spur gear 52 and the attached driver 31 in a counterclockwise direction. Similarly, as the spur gear 53 rotates in a clockwise direction, it engages and rotates the spur gear 54 and the connected driver 34 in a counterclockwise direction. Since the spur gears 51-54 are of the same diameter, the four drivers 30, 31, 33 and 34 will be rotated at the same speed. Furthermore, the pair of drivers 30 and 31 will be rotated in opposite directions for advancing the tube 11 from the right to the left along the path 29 and the pair of drivers 33 and 34 will be rotated in opposite directions for also advancing the tube 11 from right to left along the path 29.

As previously indicated, the inclined teeth 36 and 37 on the pair of drivers 30 and 31 and the inclined teeth 36 and 37 on the pair of drivers 33 and 34 project into the path 29 for engaging the tube 11. As the tube 11 is initially advanced between the drivers 30 and 31, indentations 67 (see FIGS. 1 and 2) are deformed into opposite sides of the tube 11 by the teeth 36 and 37. These indentations provide a strong grip between the drivers 30 and 31 and the tube 11. It should be noted that the spacing between the indentations 67 on one side of the tube 11 will correspond to the spacing between the teeth 36 on the driver 30 and that the spacing between the indentations 67 on the opposite side of the tube 11 will correspond to the spacing between the inclined teeth 37 on the driver 31. Preferably, these spacings are identical. It is also desirable to space the shafts 38 and 40 a distance equal to a multiple of the spacing between the teeth 36 and to space the shafts 39 and 41 a distance equal to a multiple of the spacing between the teeth 37. By so spacing the shafts 38 and 40 and the shafts 39 and 41, the teeth 36 on the driver 33 will engage the same indentations 67 formed in the tube 11 by the teeth 36 on the driver 30 and the teeth 37 on the driver 34 will engage the same indentations 67 formed in the tube 11 by the teeth 37 on the driver 31. This provides for a greater driving force between the drivers 33 and 34 and the tube 11 than might otherwise occur if the teeth 36 and 37 on the drivers 33 and 34 did not engage the indentations 67.

Although a preferred embodiment of the tube extractor 10 has been described above, it will be appreciated that various modifications and changes may be made without departing from the spirit and the scope of the following claims.

What I claim is:

1. A tube extractor comprising, in combination, a housing having a passageway extending therethrough along which a tube is advanced, first and second pairs of drivers, four shafts, means attaching each of said drivers to a different one of said shafts, means mounting said shafts in said housing for rotation about parallel axes which extend perpendicular to said passageway with a first driver in each pair positioned on one side of said passageway and a second driver in each pair positioned on an opposite side of said passageway, means on said drivers extending into said passageway for deformably engaging sides of a tube in said passageway, and motor means for simultaneously rotating all of said drivers at the same speed for advancing a tube along said passageway, said rotating means including means for rotating said first drivers in each pair in a predetermined direction and means for rotating said second drivers in each pair in the opposite direction.

2. A tube extractor, as set forth in claim 1, wherein said means on said drivers for engaging sides of a tube in said passageway comprises a plurality of inclined teeth spaced about each driver, said teeth on each driver describing a path as such driver is rotated which extends into said passageway.

3. A tube extractor, as set forth in claim 1, wherein said motor means includes four spur gears each having the same diameter and having the same predetermined number of teeth, means attaching a different one of said spur gears to each of said shafts with said four spur gears coplanar within said housing, said spur gears having a predetermined large diameter and spacing such that the spur gears attached to the two shafts for each pair of drivers drivably engage each other, an idler spur gear, means mounting said idler spur gear in said housing for simultaneously engaging and driving the two spur gears attached to the shafts for said first drivers in said pairs of drivers and for rotation about an axis parallel to the axes of said shafts, a motor, and means for rotating said idler spur gear from said motor whereby said first drivers are rotated in one direction and said second drivers are rotated in an opposite direction when said idler spur gear is rotated by said motor.

4. A tube extractor, as set forth in claim 3, wherein said motor is a pneumatic motor, and further including throttle valve means for supplying a controlled flow of compressed air to said motor for controlling the speed of said motor.

5. A tube extractor, as set forth in claim 4, wherein said means on said drivers for engaging sides of a tube in said passageway comprises a plurality of inclined teeth spaced about each driver, said teeth on each driver describing a path as such driver is rotated which extends into said passageway.

* * * * *